Nov. 25, 1924.
H. J. HANK
1,517,116
STEERING POST EXTENSION FOR TRACTORS
Filed June 4, 1924
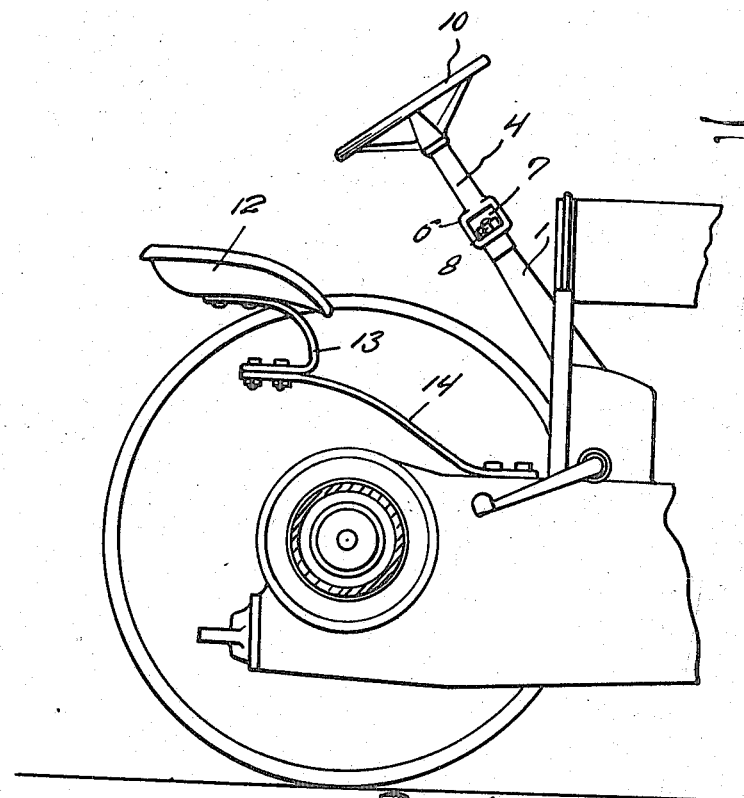
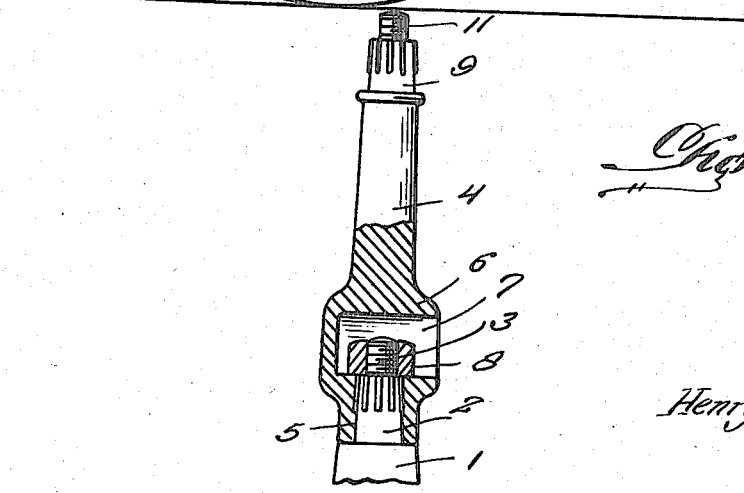
Henry J. Hank,
Inventor
By Clarence A. O'Brien
Attorney Patented Nov. 25, 1924.

1,517,116

UNITED STATES PATENT OFFICE.

HENRY JOSEPH HANK, OF HENRY, ILLINOIS.

STEERING-POST EXTENSION FOR TRACTORS.

Application filed June 4, 1924. Serial No. 717,758.

*To all whom it may concern:*

Be it known that I, HENRY JOSEPH HANK, a citizen of the United States, residing at Henry, in the county of Marshall and State of Illinois, have invented certain new and useful Improvements in a Steering-Post Extension for Tractors, of which the following is a specification.

This invention relates to new and useful improvements in attachments for Fordson tractors and has for its principal object to provide an extension for the steering post thereof.

A further object of the invention is to provide an extension for the steering post and for the seat of a Fordson tractor whereby the operator may comfortably yet efficiently control the operation of the tractor.

A further object of the invention is to provide an attachment of the above mentioned character, which is simple in construction, inexpensive, strong and durable and furthermore adapted for the purposes for which it is designated.

A further object is to provide a device of the above mentioned character, which may be readily and easily placed in position on a Fordson tractor.

Other objects and advantages of this invention will become apparent during the course of the following description.

In the accompanying drawing forming a part of this specification and in which like numerals designate like parts throughout the same:

Figure 1 is a side elevation of a portion of a Fordson tractor showing my attachment in position thereon, and Figure 2 is a view partly in elevation and partly in section of the steering post extension.

In the drawing wherein for the purpose of illustration is shown the preferred embodiment of my invention, the numeral 1 designates the steering post or shaft of a Fordson tractor and the upper end thereof is reduced as illustrated at 2 and terminates in the threaded portion 3. A steering wheel is ordinarily secured on the reduced portion 2 of the steering post 1 and held thereon by means of a suitable nut which is threaded onto the threaded end 3. The arrangement of the steering post and steering wheel therefor on a Fordson tractor at the present time is such as to cause discomfort to the operator while seated on the tractor and furthermore the steering post and wheel is very low, causing the operator to be constantly receiving the heat from the engine and also the dust caused by the operation of the tractor.

My improvement comprises an extension for the steering post and an extension for the tractor seat so that the operator may comfortably and efficiently control the operation of the tractor either in a sitting or standing position. The steering post extension comprises a casting designated by the numeral 4, the same tapering smaller toward its upper end. The lower portion of the casting is provided with a vertically extending opening 5 for receiving the reduced portion 2 of the steering post 1, it being understood of course that the steering wheel has been removed from the reduced portion 2. A vertically extending opening 5 is also provided with the vertically extending slotted portion for receiving the ribs arranged on the outer face of the reduced portion 2 in the manner clearly illustrated in Figure 2 of the drawing.

The lower portion of the casting 4 is provided with an enlargement 6 and the same is provided with the lateral opening 7 which communicates with the vertical opening 5 so that the threaded end 3 of the steering post 1 may extend therein. The purpose of the opening 7 is to provide a means whereby a fastening nut 8 may be received therein for engagement with the threaded end 3 of the shaft 1 in the manner clearly illustrated in Figure 2. The opening 7 furthermore provides a means for the reception of a suitable tool such as a wrench or the like for actuating the nut 8 in placing the same in tight engagement for actuating the same on the threaded end 3 whereby the extension will be securely supported on the upper end of the steering post.

The upper end of the extension is provided with a reduced portion 9 similar to the reduced portion 2 of the upper end of the steering post for the reception of the steering wheel 10 and a threaded portion 11 extends from the reduced portion 9 for receiving the clamping nut which is usually associated with the steering wheel whereby the latter may be supported in a rigid position on the steering post. In this manner the steering post will support the steering wheel through the medium of the extension 4 in a higher position and accordingly the tractor seat 12 will have an auxiliary spring 13 secured thereto at one end and at its opposite end to the outer end of the usual seat supporting spring 14.

With the parts arranged as shown in Figure 1 of the drawing, a person operating the tractor may comfortably and efficiently control the steering of the tractor without receiving all of the heat from the engine or the dust caused by the operation of the tractor when in use. Furthermore, the operator may control the steering of the tractor either in a standing or sitting position.

The simplicity of my device enables the same to be readily and easily attached in position on a Fordson tractor and will further be strong and durable as well as inexpensive.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In combination with the steering post of a tractor having its upper end reduced and provided with a threaded extension, an extension for said steering post comprising a casting having a vertical opening in the lower end thereof for receiving the reduced portion of the upper end of the steering post, said casting having a lateral opening provided therein for operating with the vertical opening for receiving the threaded end of the steering post, a nut threaded on said threaded end and disposed in said lateral opening, and a steering wheel mounted on the upper end of said casting.

In testimony whereof I affix my signature.

HENRY J. HANK.